(12) United States Patent
White et al.

(10) Patent No.: US 9,121,937 B2
(45) Date of Patent: Sep. 1, 2015

(54) METHOD AND APPARATUS FOR TRACKING A GLOBAL NAVIGATION SATELLITE SYSTEM WITHIN THE CONSTRAINTS OF AN INDOOR FACILITY

(75) Inventors: Benjamin O. White, Crystal Lake, IL (US); Jin D. Kim, Pleasant Prairie, WI (US); Sang Eun Lee, Lake Forest, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 657 days.

(21) Appl. No.: 13/368,360

(22) Filed: Feb. 8, 2012

(65) Prior Publication Data

US 2013/0169474 A1    Jul. 4, 2013

Related U.S. Application Data

(60) Provisional application No. 61/581,190, filed on Dec. 29, 2011.

(51) Int. Cl.
*G01S 19/28* (2010.01)
*G01S 19/25* (2010.01)

(52) U.S. Cl.
CPC .............. *G01S 19/28* (2013.01); *G01S 19/258* (2013.01)

(58) Field of Classification Search
CPC .......... G01S 19/24; G01S 19/28; G01S 19/30
USPC ............. 342/357.63, 357.64, 357.67, 357.71; 701/467, 468
See application file for complete search history.

(56) References Cited

U.S. PATENT DOCUMENTS

| | | |
|---|---|---|
| 5,938,721 A | 8/1999 | Dussell et al. |
| 6,313,787 B1 | 11/2001 | King et al. |
| 7,612,714 B2 | 11/2009 | Chen et al. |
| 7,692,582 B2 | 4/2010 | Wigren et al. |
| 7,800,530 B2 | 9/2010 | Harper et al. |
| 2001/0048387 A1 | 12/2001 | Sheynblat |
| 2003/0083816 A1 | 5/2003 | Imakado et al. |
| 2007/0262900 A1 | 11/2007 | Haverkamp et al. |
| 2009/0322510 A1 | 12/2009 | Berger et al. |
| 2011/0080321 A1 | 4/2011 | Farrokhi et al. |

FOREIGN PATENT DOCUMENTS

| | | |
|---|---|---|
| EP | 0429783 B1 | 7/1995 |
| WO | 2005008273 A1 | 1/2005 |

(Continued)

OTHER PUBLICATIONS

Assisted GPS: A Low-Infrastructure Approach, Jani Jarvinen, http://www.gpsworld.com/gps/assisted-gps-a-low-infrastructure-approach-734?page_id=1, Mar. 1, 2002, all pages.

(Continued)

*Primary Examiner* — Dao Phan
(74) *Attorney, Agent, or Firm* — Morris & Kamlay LLP

(57) ABSTRACT

A method and chipset for tracking a global navigation satellite system (GNSS) within the constraints of an indoor facility. The method includes receiving assistance information on the GNSS on a mobile communication system; and sorting orbiting satellites within the GNSS by elevation angles. Additionally, lower elevation satellites are correlated within the GNSS prior to correlating higher elevation satellites.

13 Claims, 4 Drawing Sheets

(56) References Cited

FOREIGN PATENT DOCUMENTS

| | | | |
|---|---|---|---|
| WO | 2006118494 | A1 | 11/2006 |
| WO | 2007025151 | A1 | 3/2007 |

OTHER PUBLICATIONS

Patent Cooperation Treaty, International Search Report and Written Opinion of the International Searching Authority for International Application No. PCT/US2012/066933 (CS38141), Feb. 11, 2013, 11 pages.

GPS Site Survey Apparatus

METHOD AND APPARATUS FOR TRACKING A GLOBAL NAVIGATION SATELLITE SYSTEM WITHIN THE CONSTRAINTS OF AN INDOOR FACILITY

FIELD OF THE DISCLOSURE

The present disclosure relates generally to global navigation satellite systems and more particularly to effectively determine an accurate location in a timely manner in an indoor or sheltered environment.

BACKGROUND

Global navigation satellite systems such as the global positioning system (GPS) are employed by businesses and consumers. Consumers have several device choices for receiving GPS signals. The recent trend has been to place GPS software on mobile communication devices to offer consumers maps and location interest points. Whereas, conventional GPS reception requires unobstructed, clear vision to overhead orbiting satellites, the recent trend of placing GPS receivers on mobile communication devices such as smartphones, tablet computing devices, gaming devices, and laptop computers demands a reconsideration of the most effective way for transmitted signals to reach the orbiting satellites. Conventional methods of looking for direct overhead satellites and correlating several higher elevation satellites that provide high signal-to-noise ratios are much less effective for mobile communication devices within an indoor facility.

Accordingly, there is a need for a method and apparatus for tracking a global navigation system within the constraints of an indoor facility.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figures 1A, 1B:
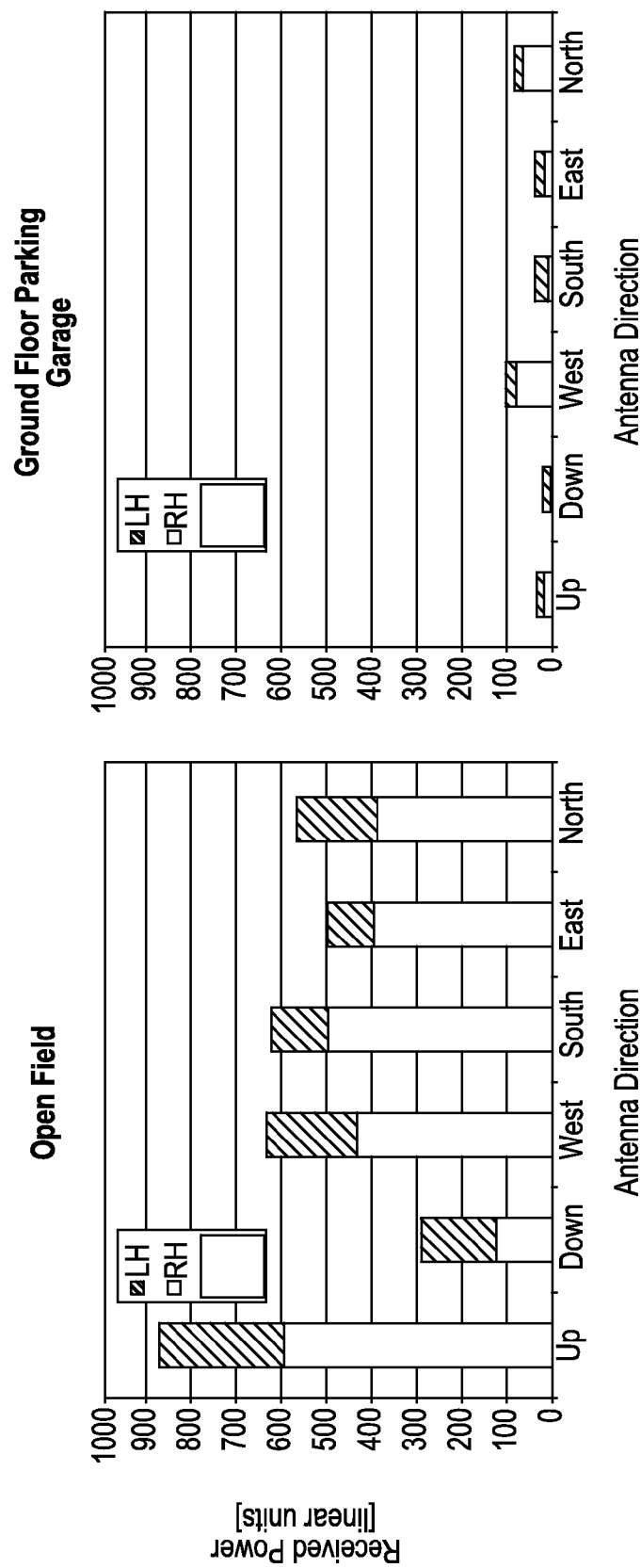
FIGS. 1A & 1B is an exemplary diagram of outdoor signal reception versus indoor signal reception.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Disclosed herein is a method for tracking a global navigation satellite system (GNSS) within the constraints of an indoor facility. The method includes receiving assistance information on the GNSS on a mobile communication system and sorting orbiting satellites within the GNSS by elevation angles. Thereafter lower elevation satellites are correlated (within the GNSS) prior to correlating higher elevation satellites. Prioritizing lower elevation satellites (also termed "near horizon satellites") results in an advantageous result for transceivers that may be within a partially enclosed commercial parking facility, where the outdoors remains visible because of large openings in the commercial parking facility. One or more embodiments may also be useful near the perimeter of a commercial or industrial building.

In the examples given above, an unexpected strong signal reception was received from the direction of the horizon, while the traditionally strong zenith direction was the weakest received power. In addition, one or more embodiments may be useful to enhance other localization techniques near the perimeter of a building or at exit/entrance points.

In one embodiment, lower elevation satellites are determined from assistance data that arrives over a Wi-Fi or cellular network to provide satellite information, including azimuth and elevation angles. The assistance data can also reside in the mobile communication device. The satellites are correlated starting with the lowest elevation satellite available that is above a predefined minimum of approximately five degrees (herein considered a lower elevation satellite) to determine Doppler frequency shift and code phase.

FIGS. 1A and 1B show a comparison of received power of outside signal reception for satellites having an elevation angle between 0-90 degrees and the indoors signal reception for satellites having an elevation angle between 0-90 degrees. Specifically, FIG. 1A (dedicated to an open field environment) shows in a bar-graph having a y-coordinate of averaged received power in linear units versus an x-coordinate which describes the antenna direction. The four cardinal antenna directions—north, south, east and west are aimed at the Earth's horizon (i.e., 0 degrees elevation). The other two directions are the zenith and nadir. Each antenna is capable of simultaneously receiving right hand circular polarization (RHCP) and left hand circular polarization (LHCP) electromagnetic waves. It has been measured and is shown that the zenith direction provided the greatest amount of received power of all six directions when the measurement was conducted in an open field. The nadir direction provided the least amount of received power for the antenna. It should be noted that experimental noise may contribute to uneven power reception for the remaining four directions: west, east, south, and north. In addition, except for the nadir direction, most of the directionally received power is dominated by the RHCP for the up direction and the four cardinal directions. This is expected since the GPS satellites broadcast in RHCP and these antennas are facing the satellites. The nadir facing antenna is dominated by LHCP which is also expected, since its reception would be primarily rays which have bounced once off the ground. RHCP waves change to LHCP upon reflection.

In contrast, FIG. 1B shows an indoor facility (e.g., a retail shopping mall's ground floor parking garage). In FIG. 1B, it was shockingly unexpected that the least amount of power received in an open field (nadir direction) is still nearly twice as much power received in the best direction of an indoor facility. That is, the west direction yielded nearly 100 linear units indoors, but was still significantly less than the nadir direction of nearly 300 linear units. This revealed that the focus should be on indoor propagation environment when determining satellite search methods rather than the conventional open field propagation models. Basically, no matter where an antenna is pointing or how search satellites are determined, a timely location fix in the outdoor environment will likely result.

In contrast, the indoor results show on average that the highest available power will occur at low elevation. In this unique case, the west direction is particularly strongest and pointing nearly at the earth's horizon versus the ninety degree zenith direction. Additional knowledge of the building structures in the approximate area could allow the device to filter by azimuth as well (as in this case it would know that the west direction is the least blocked direction and prefer satellites in that direction).

Figure 2:
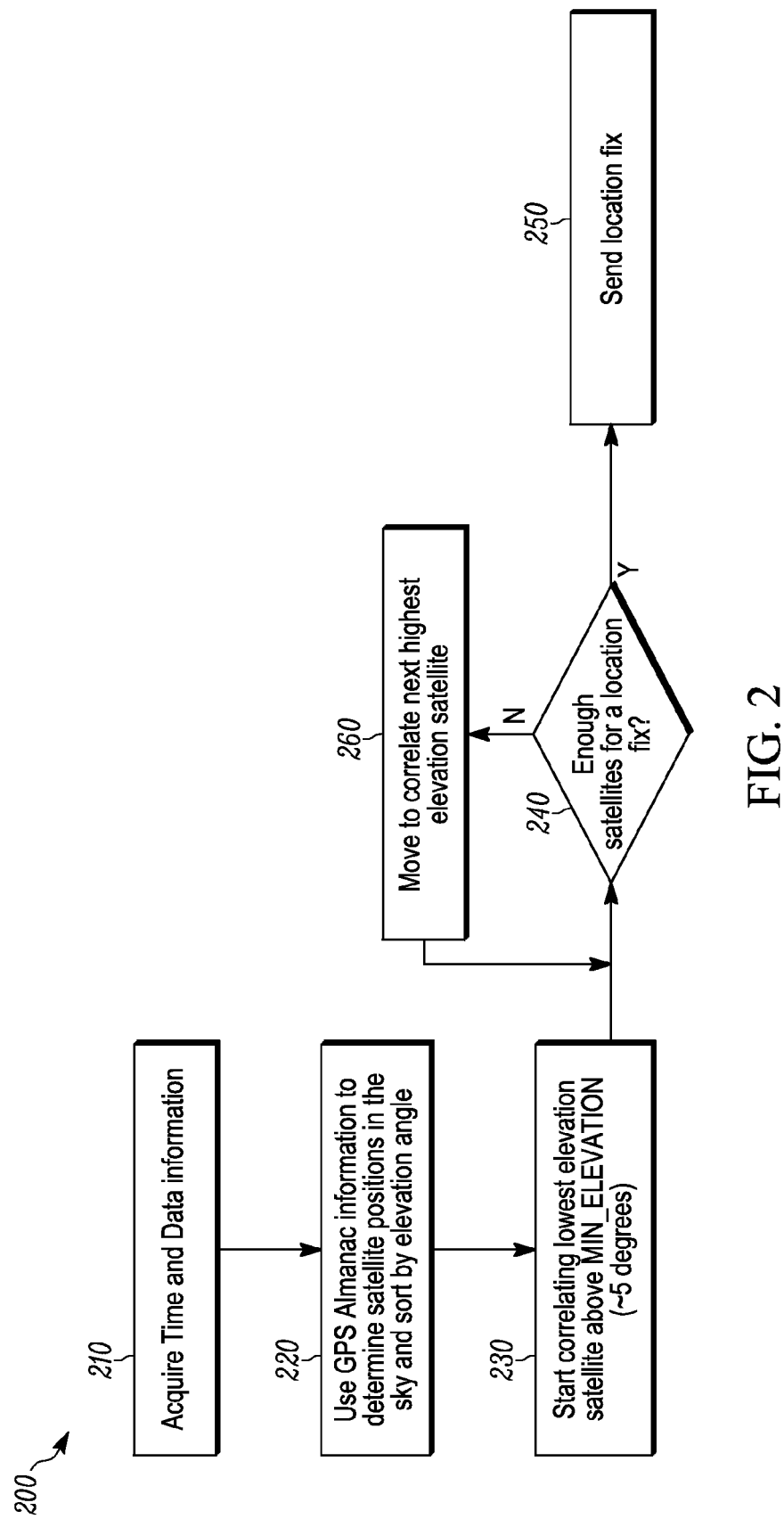
FIG. 2 is a flowchart of an exemplary method of a satellite searching scheme.

FIG. 2 is a flowchart of an exemplary method 200 of a satellite searching scheme. Operation 210 acquires time and data information from assistance data provided or stored in a GPS chipset utilized by the mobile communication device. The GPS chipset may receive updated information. Operation 220 uses the acquired time and data information (also referred to as "GPS almanac information") to determine satellite positions within the celestial sky and sorts them by elevation angle. Upon determining the satellite positions, operation 230 prioritizes satellite searching to focus first on the lowest elevation satellite above a predefined minimum of approximately five degrees as referenced from the Earth's horizon.

Operation 240 of FIG. 2 analyzes whether there are enough satellites to acquire a sufficiently accurate location fix. If the analysis yields an affirmative result, then operation 250 proceeds to communicate the location fix information to the mobile communication device. If the analysis of operation 240 yields a negative result for location fix, then operation 260 is employed to search for the next higher elevation satellite (herein considered higher elevation satellites). This is repeated until operation 240 has determined enough satellites are correlated to make a sufficiently accurate location fix.

The prioritization of the lower elevation satellite searching method using GPS satellite elevation information is advantageous over other searching methods such as those that employ direction of peak antenna gain because the elevation information is especially useful to detect lower elevation satellites that are able to transmit an effective communication signal to a transceiver that is within an indoor facility. The prioritization of the disclosed method avoids random searching and attempting to correlate with a very weak satellite due to the indoor structure attenuation. The embodiments described herein specify or predetermines the search process to effect greater reception of GPS signals indoors. For example, one embodiment may specify to a controller to acquire satellites starting with the lowest elevation above a predefined minimum of approximately five degrees and acquiring additional satellites at progressively higher elevations.

By providing greater accurate indoor navigation data, more commercial entities or businesses will be able to accessed by a smartphone, for example, acting as a personal assistant to find shopping venues, indoor work place locations, and respond to local advertising. Indoor facilities such as commercial parking garages, indoor malls, domed arenas, enterprise facilities, convention centers, and indoor retail/grocery markets can now be more readily navigated using a GPS receiver system with this satellite searching algorithm. More specifically, one or more disclosed embodiments allow a quicker determination of the user's initial position.

Figure 3:
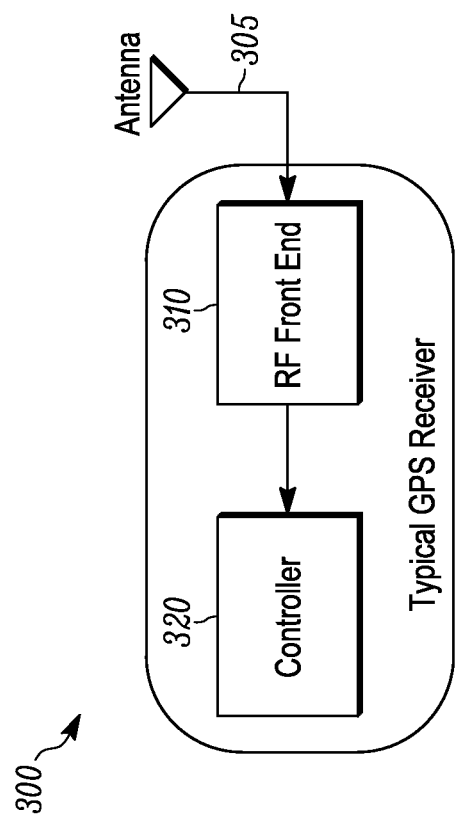
FIG. 3 is an exemplary block diagram of a GPS chipset useful in a mobile communication system.

FIG. 3 illustrates an exemplary chipset 300 useful within a mobile communication system (not shown). Chipset 300 includes an RF receiver 310 comprising an antenna 315 for receiving satellite ranging signals and a controller 320 for converting the satellite signals into latitude and longitude information. Controller 320 also receives assistance information about the GNSS on the mobile communication system. In addition, controller 320 sorts orbiting satellites within the GNSS by elevation angles, and correlates lower elevation satellites within the GNSS prior to correlating higher elevation satellites.

The sorting accomplished by controller 320 comprises sorting satellite elevation angles beginning with lower elevation angles to higher elevation angles; and controller 320 also sorts satellite elevation angles beginning with higher elevation angles to lower elevation angles.

Figure 4:
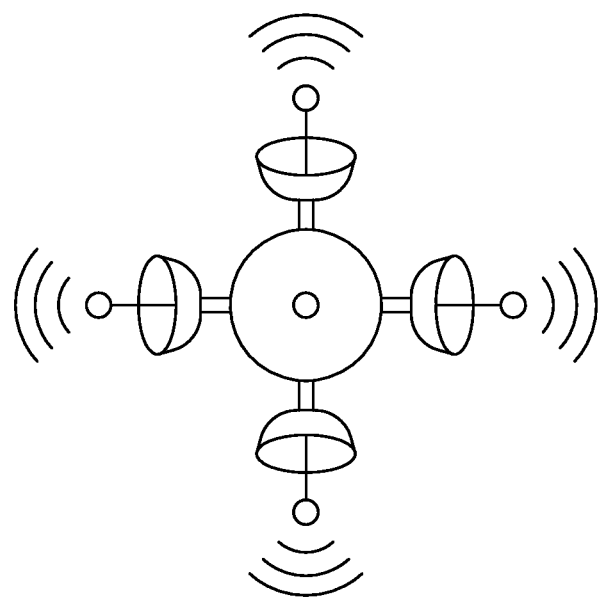
FIG. 4 is a schematic illustrating an exemplary GPS propagation site survey apparatus.

FIG. 4 illustrates an exemplary GPS site survey apparatus useful for acquiring GPS signals in each direction that were discussed earlier with respect to FIGS. 1A and 1B. The GPS site survey apparatus provided a 24 hour data set. The GPS site survey apparatus includes six dual polarization antennas that are aimed in the four cardinal directions, along with the zenith and nadir directions. Therefore, a total of twelve logging GPS receivers are electrically coupled to the antennas. The GPS site survey apparatus includes six classical dual polarization patch antennas fed with 90 degree hybrid combiners, so that they can simultaneously receive RHCP and LHCP electromagnetic waves. The antennas are held in place by a dielectric structure with the 12 logging GPS receivers contained in the center of the device to avoid interference with the antennas radiation characteristics. The power is supplied inside a choked cable (designed to be invisible for GPS frequencies ~1575 MHz) and connected to a lead acid battery located far from the apparatus. Finally, the GPS site survey apparatus is mounted on a dielectric tripod about three feet high to simulate the approximate height that a typical mobile communication device would be held by a user.

Typically, when a GPS receiver is in a cold start state, the most challenging task is to correlate the first satellite. The correlation starts by first picking a satellite and searching a two-dimensional space of code phase (time synchronization) and Doppler frequency shift (frequency synchronization). Since this takes substantial computational resources, the first satellite(s) chosen should have a reasonable probability of having a strong signal coming into the receiver. The common method used to ensure this is to randomly choose a satellite filtered by an elevation mask such that only satellites above a certain predefined elevation can be chosen. Lower elevation satellites are typically discouraged, because the RF signal must pass though more atmosphere (hence, more attenuation), and is more likely to be affected by the ionosphere (unpredicted time delays); and can be more susceptible to ground bounce interference (multi-path attenuation/time delay). However, the indoor (or semi-indoor) environment is the most challenging to acquire the first GPS location fix when compared to a pure outdoor environment. Measurements described above show the majority of signal available indoors to the receiver comes from low elevation satellites, with substantially less coming from higher elevation satellites. GPS receiver performance is already very good in the outdoor case (i.e., signal levels are high in all directions compared to the indoor case), so the GPS receiver can tolerate some slight degradation in performance by starting with lower elevation satellites. However, this slight degradation is balanced by a substantial improvement to the indoor GPS fix time.

To provide an additional azimuth masking for starting the satellite search within a building structure additional information can be gleaned or sent to the mobile communication device, including approximate location data (for example, latitude and longitude) and building structure information comprising known large openings within the building structure itself, for example exit or entrance openings or large viewing areas on one or more different levels of the building structure.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Likewise, computer-readable storage medium can comprise a non-transitory machine readable storage device, having stored thereon a computer program that include a plurality of code sections for performing operations, steps or a set of instructions.

Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for tracking a global navigation satellite system (GNSS) within the constraints of an indoor facility, comprising the steps of:
   receiving assistance information on the GNSS and additional assistance information including facility information on a mobile communication system;
   sorting orbiting satellites within the GNSS by elevation angles; and
   correlating lower elevation satellites within the GNSS using azimuth masking based on the additional assistance information prior to correlating higher elevation satellites.

2. The method according to claim 1; wherein the lower elevation satellites are less than 50 degrees above earth's horizon.

3. The method according to claim 1; wherein the step of sorting further comprises sorting from a lower elevation angle to a higher elevation angle.

4. The method according to claim 1; wherein the step of sorting further comprises sorting from a higher elevation angle to a lower elevation angle.

5. The method according to claim 1; wherein the assistance information on the GNSS includes almanac and ephemeris data.

6. The method according to claim 1; wherein the indoor facilities are selected from the group consisting of:
   parking garages, indoor malls, domed arenas, enterprise facilities, convention centers, and indoor retail/grocery markets.

7. The method according to claim 1; wherein the additional assistance information includes an approximate location and facility structure information comprising known large openings in the facility structure.

8. The method according to claim 1; further comprising the step of determining whether the mobile communication device was inside prior to employing correlation of lower elevation satellites within the GNSS in advance of correlating higher elevation satellites.

9. A chipset within a mobile communication system, comprising,
- an RF receiver comprising an antenna for receiving satellite ranging signals;
- a controller for converting the satellite ranging signals into latitude and longitude information;
- wherein the controller also receives assistance information about a global navigation satellite system (GNSS) and additional assistance information including facility information on the mobile communication system; sorts orbiting satellites within the GNSS by elevation angles; and
- correlates lower elevation satellites within the GNSS using azimuth masking based on the additional assistance information prior to correlating higher elevation satellites.

10. The chipset according to claim 9; wherein the lower elevation satellites are less than 50 degrees above earth's horizon.

11. The chipset according to claim 9; wherein the controller sorts satellite elevation angles beginning with lower elevation angles to higher elevation angles.

12. The chipset according to claim 9; wherein the controller sorts satellite elevation angles beginning with higher elevation angles to lower elevation angles.

13. The chipset according to claim 9; wherein the assistance information on the GNSS includes almanac and ephemeris data.

* * * * *